S. S. SWANSON.
CULTIVATOR.
APPLICATION FILED JAN. 2, 1913.
1,108,020.
Patented Aug. 18, 1914.
3 SHEETS—SHEET 3.
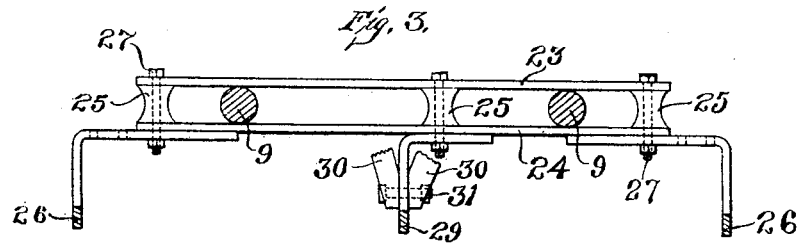
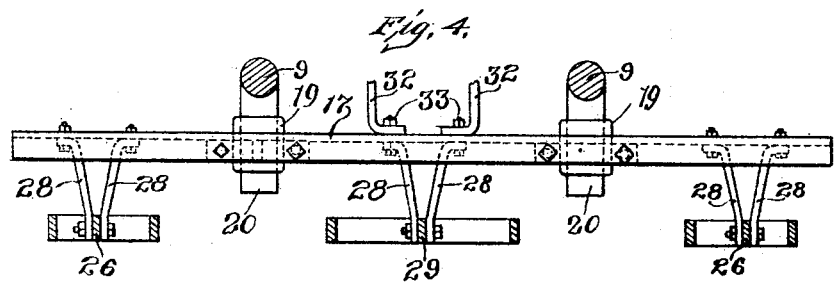
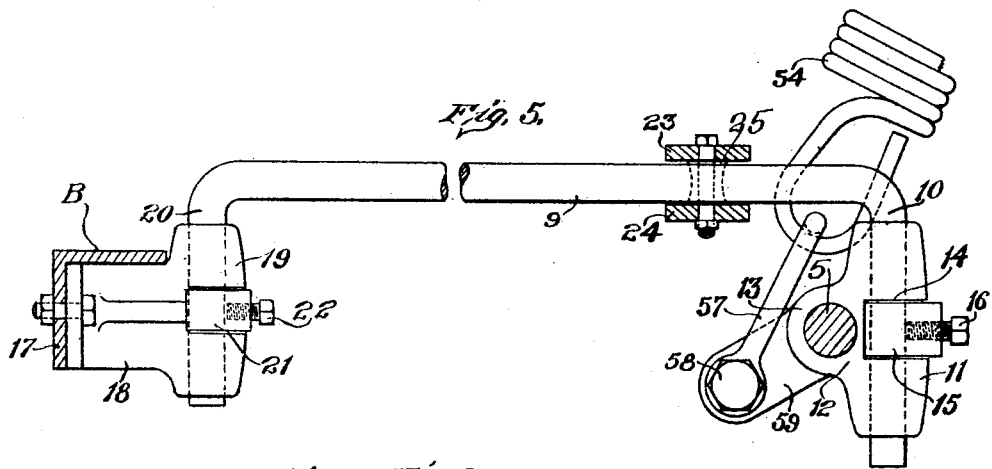
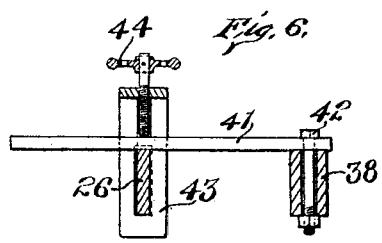
Inventor
Stanley S. Swanson.
Witnesses
George E. Ireland.
Harriet L. Hammaker.
By Toulmin & Reed Attorneys.

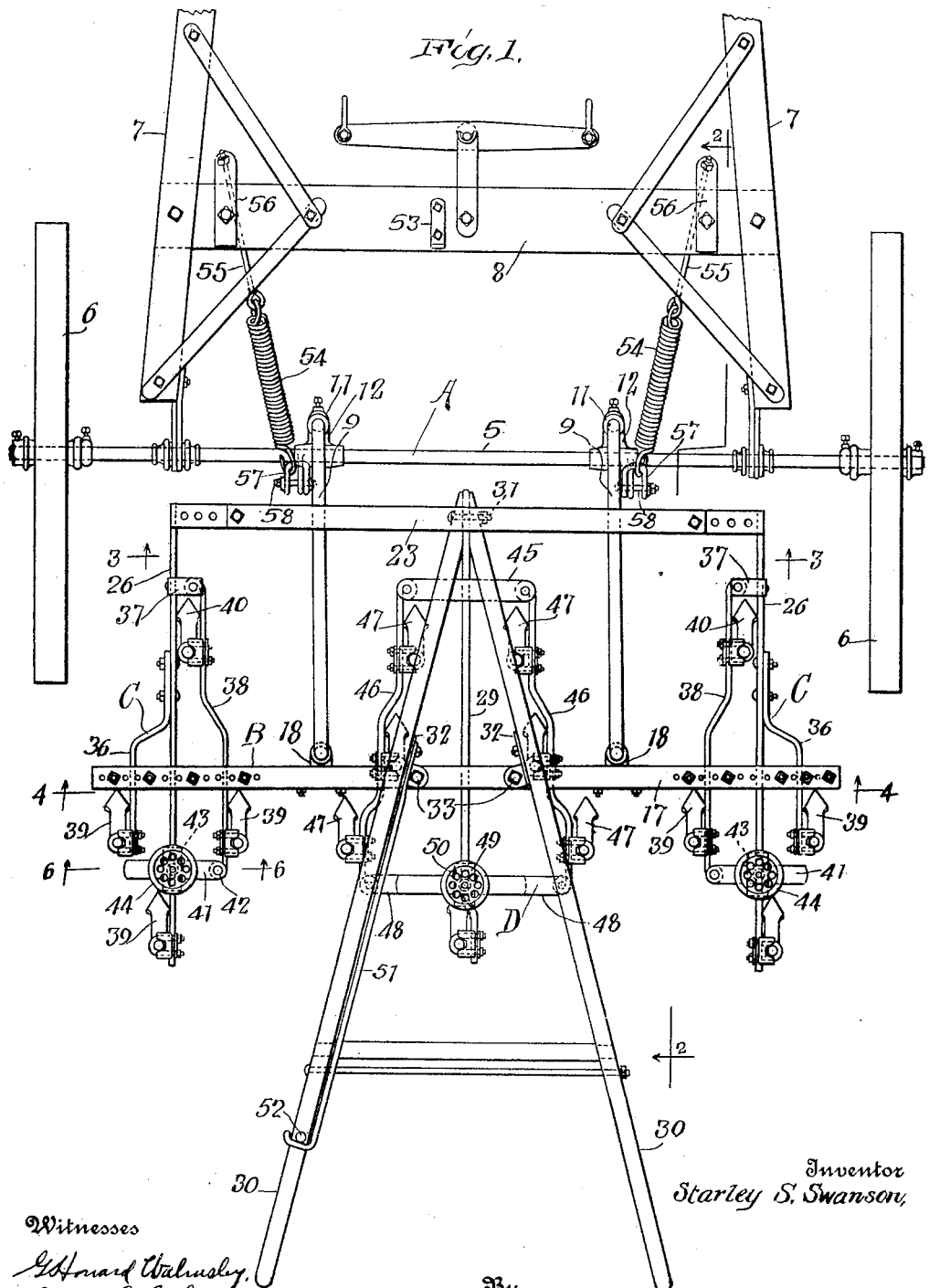

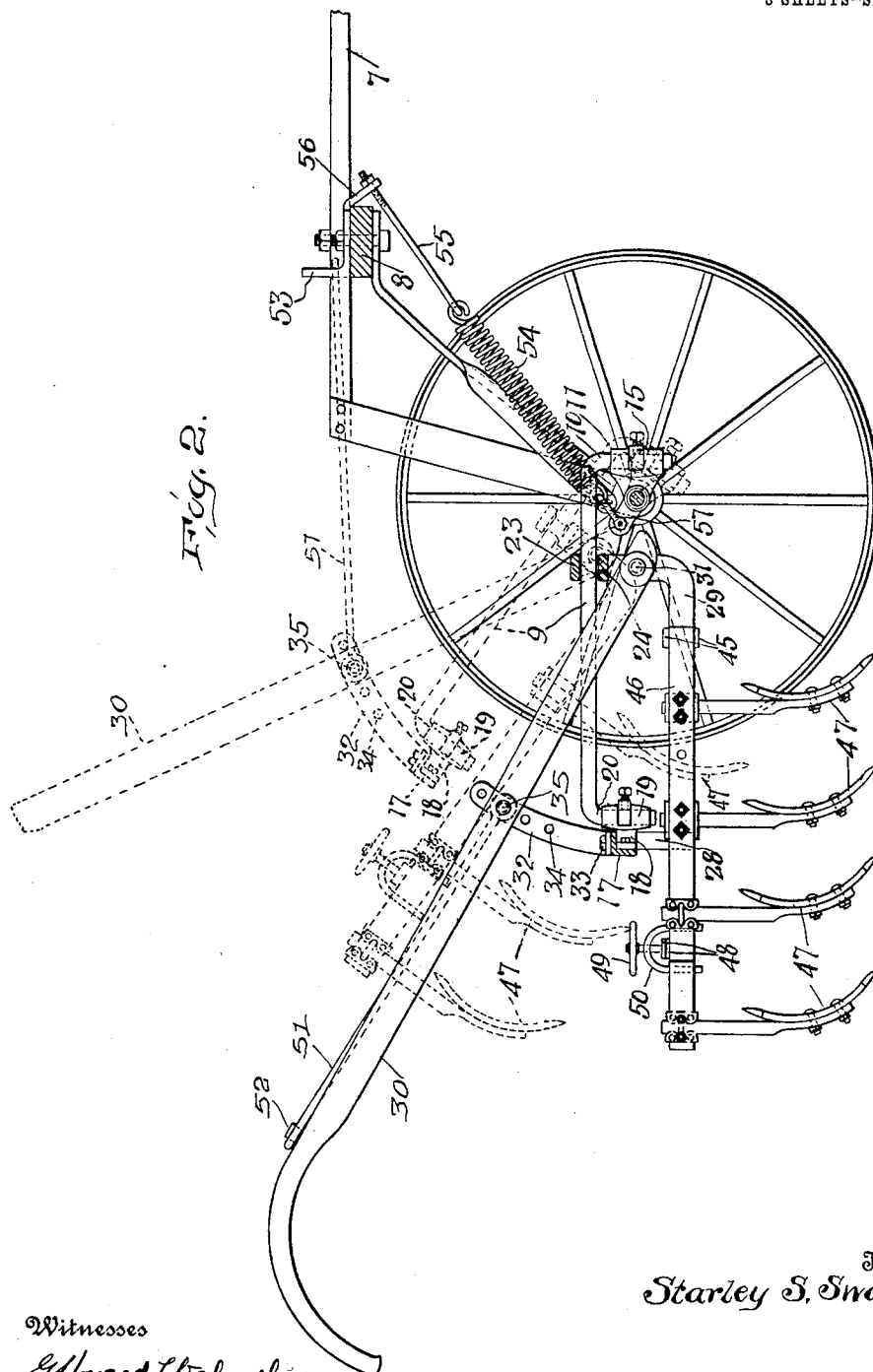

UNITED STATES PATENT OFFICE.

STARLEY S. SWANSON, OF BELLEVUE, OHIO, ASSIGNOR TO THE OHIO CULTIVATOR COMPANY, OF BELLEVUE, OHIO, A CORPORATION OF OHIO.

CULTIVATOR.

1,108,020.  Specification of Letters Patent.  Patented Aug. 18, 1914.

Application filed January 2, 1913.  Serial No. 739,638.

*To all whom it may concern:*

Be it known that I, STARLEY S. SWANSON, a citizen of the United States, residing at Bellevue, in the county of Huron and State of Ohio, have invented certain new and useful Improvements in Cultivators, of which the following is a specification, reference being had therein to the accompanying drawing.

This invention relates to new and useful improvements in agricultural implements of that type which are commonly known as wheeled cultivators.

The principal object of the invention is to provide such an implement with an earth-engaging tool that is capable of being shifted bodily in a transverse line to the line of draft so as to position said tool toward or away from the line of work or to avoid any solid obstructions, such as stumps or large stones, without altering the position of the tool with relation to the line of draft.

Another object of the invention is to connect the earth-engaging tool with a main frame in such a manner that the tool will be capable of having a vertical swinging movement so that when desired the tool may be readily elevated above the ground.

A further object of the invention is to provide a means for locking the tool in its elevated position above the ground, thus greatly facilitating the transporting of the cultivator from place to place.

A further object of the invention is to provide a novel means for exerting an upward pull on the tool so as to facilitate the work of the operator when shifting the tool either transversely or when elevating the same.

Another object of the invention is to provide a cultivator which includes a plurality of shovel gangs, the shovels of each gang being capable of having lateral movements toward or away from each other so as to vary the shovels to accommodate the same to work of different kinds.

In the accompanying drawings, Figure 1 is a top plan view of a wheeled cultivator constructed in accordance with my invention; Fig. 2 is a vertical, longitudinal, sectional view taken on the line 2—2 of Fig. 1; Fig. 3 is a detail sectional view taken on the line 3—3 of Fig. 1; Fig. 4 is a detail sectional view taken on the line 4—4 of Fig. 1; Fig. 5 is an enlarged view, partly in section, showing the connection between the main and supplemental frames; and Fig. 6 is a detail sectional view taken on the line 6—6 of Fig. 1 showing the adjustable connection between the main drag bar and one of the shovels of one of the gangs.

In these drawings I have illustrated one embodiment of my invention and, in the present instance, there is shown a main frame A which includes an axle 5 that is supported by ground wheels 6, the latter being adjustably mounted for a limited distance on said axle. Connected to the axle in any suitable manner is a draft element which is here shown as a pair of shafts 7, said shafts being connected by the usual cross bars 8. Connected to this axle is a supplemental frame which carries a plurality of earth-engaging tools, the frame being capable of being bodily moved transversely to the line of draft. The supplemental frame is also capable of being swung upwardly so as to dispose the tools above the ground, thereby greatly facilitating the transverse movement of said supplemental frame. In order to assist in so elevating the supplemental frame, there is provided means for effecting an upward pull on said supplemental frame, this means relieving the operator of a portion of the weight of said frame.

The supplemental frame is designated as a whole by the reference letter B and this frame is connected to the main frame A through the medium of spaced parallel links 9—9 which extend rearwardly from the axle 5. The forward end of each link is bent downwardly at right angles to the major portion to form a spindle 10. Each spindle is journaled in a vertical socket 11 that is formed on a bearing casting 12, said casting including a bearing 13 that is journaled on the axle 5. In order to lock the spindles 10 against vertical movements the socket 11 is centrally formed with a horizontal recess 14, and disposed within this recess is a collar 15 which receives the spindle 10. A set screw 16 is carried by the collar and bears against the spindle 10. It will thus be observed that the spindle is capable of having a rotary movement within the socket but is prevented by said collar and set screw from having any vertical play. While I have shown this particular means for locking the spindle against vertical movement it is obvious that other means may be employed for accomplishing this result if so desired.

The supplemental frame B includes a transverse frame member 17 which in this instance is formed from a single length of angle iron. Detachably secured to this member is a pair of spaced castings 18, each casting including a vertical socket 19 for receiving a spindle 20 which extends downwardly from the rear end of the respective link 9. The spindle 20 is capable of having rotary movement within the socket 19 but is retained against vertical movements by a collar 21 and set screw 22. Disposed above and below the links 9 are upper and lower transverse bars 23 and 24 constituting a second transverse frame member. These bars are held in spaced relation by means of spacing sleeves 25, the distance between the bars being sufficient to permit the links 9 to have a free movement therebetween. Carried by the supplemental frame B are outer cultivator gangs C—C and an intermediate cultivator gang D. Each of the gangs C includes a main drag bar 26, each drag bar having its forward end adjustably connected for lateral movement to one end of the spaced bars 23 and 24 through the medium of a bolt 27 which serves to hold the adjacent spacing sleeve 25 in position. The rear end of each main drag bar 26 is adjustably connected to the transverse frame member 17 through the medium of brackets 28—28. The intermediate cultivator gang D includes a main drag bar 29 which is connected at its front end to the spaced bars 23 and 24, and at its rear end to the frame member 17 by similar brackets 28. A pair of handles 30—30 have their forward ends pivotally connected by a bolt 31 to the forward end of the main drag bar 29 of the intermediate cultivator gang D. Extending upwardly from the frame member 17 is a pair of arcuate standards 32, each standard being connected to said member by bolts 33, said bolts also serving to connect the intermediate brackets 28. Each standard 32 is formed with a series of holes 34, any one of which being adapted to receive a bolt 35 carried by the respective handle 30. As a result the handles 30 may be held at various angles with respect to the ground so as to accommodate the cultivator to operators of different sizes.

Fixedly attached to each main drag bar 26 is a supplemental drag bar 36, which is offset from the main bar and arranged parallel therewith but terminates at its rear end in advance of the rear end of the main bar. Carried by the main bar 26 at a point slightly in the rear of the forward end thereof is a bracket 37, said bracket extending in a direction opposite the supplemental bar 36. Pivotally connected to this bracket is one end of a second supplemental bar 38, the rear portion thereof being offset and normally arranged in parallel relation with the main bar 26. The bar 38 likewise terminates at its rear end in advance of the rear end of the main bar, and detachably connected to the rear end of each of the bars 26, 36 and 38 is an earth-engaging tool which in this instance is shown as a shovel 39. Also secured to the forward portion of the second-mentioned supplemental bar 38 is a similar tool 40. Often times it is desirous to adjust the lateral distance between certain of the shovels and in order to retain the supplemental drag bar 38 in an adjusted position, there is provided a link 41 which is pivotally connected, as at 42, to the rear end of said bar. This link extends over and upon the main drag bar 26, and in order to lock said link to said main bar, there is provided an inverted U-shaped clip 43 which is formed with suitable openings for permitting said clip to be slipped onto the main bar 26, the space between the lugs of this clip being of sufficient width to receive the link 41. A tension screw 44 is adjustably mounted in the connecting portion of this clip and serves to clamp the link 41 against the main bar 36 and thereby lock said link and, consequently, the laterally swinging drag bar 38, in an adjusted position.

The intermediate cultivator gang D includes a cross head 45 which is secured to the main drag bar 29 by any suitable means. Pivotally connected to the end of the cross head 45 are rearwardly extending drag bars 46—46, each bar having one or more shovels 47 connected therewith. Pivotally connected to the rear ends of the drag bars 46 are inwardly extending links 48—48. These links are arranged in overlapping relation upon the main drag bar 29 and are adapted to be locked in any adjusted position through the medium of a tension screw 49 and clip 50.

From the foregoing it will be observed that the supplemental frame B is capable of being swung upwardly by reason of its pivotal connection with the axle 5 through the medium of the links 9 and bearings 13. This connection permits the supplemental frame to be readily moved bodily and transversely of the line of draft. At the same time this connection permits of the supplemental frame being swung upwardly so that it may be locked to the main frame and thereby easily transported from place to place. It will be noted that the earth-engaging tools are held in fixed relation to the supplemental frame and that the transverse movement of this frame is at right angles to the line of draft, this being due to the link 9 by means of which the supplemental frame is connected with the axle. Thus, the earth-engaging tools are always in a position to properly act upon the soil regardless of the lateral displacement thereof. In order to lock the supplemental frame B in its elevated position a hook rod 51 is pivotally connected to one of the handles and is normally engaged with a pin 52 also carried by said handle. This rod is adapted, when the supplemental frame is elevated, to be disengaged from the pin 52 and engaged with a vertical lug 53 which is carried by the cross bar 8 of the shafts 7 and thereby lock said supplemental frame in its elevated position.

It is to be noted that when the supplemental frame B is either shifted transversely or swung upwardly, the weight of said supplemental frame necessitates considerable effort on the part of the operator. In order to lessen the weight of the frame and, consequently, minimize the effort of the operator, there is provided means for exerting an upward pull on said supplemental frame. This means consists of a pair of coiled springs 54 which are each connected at their upper ends by a link 55 to a clip 56 that is attached to one end of the cross bar 8 of the shaft 7. The lower end of each spring 54 is connected to a link 57 which, in turn, is pivotally connected through the medium of a bolt 58 to a lug 59 which extends rearwardly and downwardly from the bearing casting 12, and which is rigidly connected to said casting. The springs 54 are normally disposed in extended relations so that as soon as the supplemental frame B is elevated the retractile effect of the springs will be to partially swing the supplemental frame upwardly so that the same may be shifted either transversely of the line of draft or may be further elevated and later locked, as above noted.

While I have shown and described one embodiment of my invention it will be understood that the same has been chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. The combination, with an axle, and ground wheels therefor, of a laterally movable frame comprising two transverse members arranged one in front of the other, a plurality of individual shovel gangs, each connected with the rear member of said frame and each having a forwardly extending drag bar connected to the front member of said frame, and a plurality of links pivotally connected with said frame and with said axle.

2. The combination, with an axle, and ground wheels therefor, of a laterally movable frame comprising two transverse members arranged one in front of the other, a plurality of individual shovel gangs, each connected with the rear member of said frame and each having a forwardly extending drag bar connected to the front member of said frame, a plurality of links pivotally connected with said frame and with said axle, and a handle connected at its forward end to one of said drag bars and connected at a point between its ends with said frame.

3. The combination, with an axle, and ground wheels supporting said axle, of a plurality of individual shovel gangs, a frame comprising a rear member extending above said gangs and transversely thereto, means for rigidly connecting the individual gangs with said transverse member near their rear ends, and a second transverse member arranged near the forward ends of said gangs and rigidly connected therewith, and links pivotally connected at their opposite ends with the axle and the rear member of said frame, respectively.

4. The combination, with an axle, and ground wheels supporting said axle, of a plurality of individual shovel gangs, a frame comprising a rear member extending above said gangs and transversely thereto, means for rigidly connecting the individual gangs with said transverse member near their rear ends, and a second transverse member arranged near the forward ends of said gangs and rigidly connected therewith, and a plurality of links pivotally connected at their rear ends on vertical axes to the rear member of said frame and pivotally connected at their forward ends on both vertical and horizontal axes with said axle.

5. The combination, with an axle, ground wheels supporting the same, a plurality of individual gangs, each gang comprising a plurality of shovel carrying bars, means for adjusting said bars laterally relatively one to the other, a frame, means for adjustably connecting each gang to said frame to permit of the lateral adjustment of said gangs relatively one to the other, and links connecting said frame with said axle.

In testimony whereof, I affix my signature in presence of two witnesses.

STARLEY S. SWANSON.

Witnesses:
E. H. ERDRICH,
H. BERGMAN.